US008560500B2

(12) United States Patent
Grabsky et al.

(10) Patent No.: US 8,560,500 B2
(45) Date of Patent: *Oct. 15, 2013

(54) METHOD AND SYSTEM FOR REMOVING ROWS FROM DIRECTORY TABLES

(75) Inventors: John B. Sandrock Grabsky, Naperville, IL (US); John C. Tucker, Downers Grove, IL (US); Matt H. Hammer, Aurora, IL (US)

(73) Assignee: CA, Inc., Islandia, NY (US)

(*) Notice: Subject to any disclaimer, the term of this patent is extended or adjusted under 35 U.S.C. 154(b) by 1099 days.

This patent is subject to a terminal disclaimer.

(21) Appl. No.: 11/748,798

(22) Filed: May 15, 2007

(65) Prior Publication Data
US 2007/0214168 A1 Sep. 13, 2007

Related U.S. Application Data

(63) Continuation-in-part of application No. 10/911,828, filed on Aug. 5, 2004, now Pat. No. 7,765,247.

(60) Provisional application No. 60/524,704, filed on Nov. 24, 2003.

(51) Int. Cl.
*G06F 7/00* (2006.01)
*G06F 17/00* (2006.01)

(52) U.S. Cl.
USPC .......................... 707/640; 707/662; 707/676

(58) Field of Classification Search
None
See application file for complete search history.

(56) References Cited

U.S. PATENT DOCUMENTS

| 5,721,915 | A | * | 2/1998 | Sockut et al. ............... 1/1 |
| 5,887,274 | A | | 3/1999 | Barry et al. ................ 707/202 |
| 6,073,129 | A | * | 6/2000 | Levine et al. .............. 1/1 |
| 6,453,313 | B1 | * | 9/2002 | Klein et al. ................ 707/3 |
| 7,051,051 | B1 | * | 5/2006 | Stegelmann ............... 707/202 |
| 2001/0047360 | A1 | * | 11/2001 | Huras et al. ............... 707/102 |
| 2004/0034643 | A1 | * | 2/2004 | Bonner et al. ............. 707/100 |
| 2004/0054922 | A1 | * | 3/2004 | Hiraga et al. ............. 713/200 |
| 2005/0114365 | A1 | * | 5/2005 | Tucker ....................... 707/100 |
| 2005/0131966 | A1 | * | 6/2005 | Lou ............................ 707/204 |
| 2005/0283485 | A1 | * | 12/2005 | Blaicher et al. ........... 707/100 |
| 2006/0117029 | A1 | * | 6/2006 | Yingst ....................... 707/100 |

OTHER PUBLICATIONS

DB2 Developer's Guide, Fourth Edition by Craig Mullins; Publisher: Sams; Pub Date: May 11, 2000; More recent edition of this book available. Print ISBN-10: 0-672-31828-8; Print ISBN-13:978-0-672-31828-3 Pertinent: Data Modification Guidelines, Recover Phases: Backup & Recovery Utilities; Index Image Copies.*
Jones K.: "Odd Data in Dbases" CLX Mailing List Archive, Jul. 15, 1999, XP 002319357; retrieved from the Internet: URL:http://he.fi.archive/clx/1999/0432.htm, Retrieved on Dec. 3, 2007.

(Continued)

*Primary Examiner* — Cheryl Lewis
*Assistant Examiner* — Raheem Hoffler
(74) *Attorney, Agent, or Firm* — Baker Botts, LLP

(57) ABSTRACT

The present disclosure is directed to a method and system for removing rows from directory tables. In accordance with a particular embodiment of the present disclosure, an image copy of at least a portion of a database directory table is created. A plurality of candidate rows to delete from the directory table is identified by comparing each row of the portion of the database directory table against one or more deletion criteria. An updated image copy is established by deleting the plurality of candidate rows from the image copy.

23 Claims, 4 Drawing Sheets

(56) References Cited

OTHER PUBLICATIONS

Freidel A. L.S.: DB2: The importance of the Modify Utility: Mainframe Week, Jan. 16, 2002, XP 002319358; retrieved from the Internet: URL:http://web.archive.org/web/20020204114439/http://www.mainframeweek.com/journals/show.php/0001/12, Retrieved on Dec. 3, 2007.

Bell L.: "Your can be a DB2 Recovery Expert" DBAZINE.COM, May 2002, XP 002319364; retrieved from the Internet: URL:http://www.dbazine.com/db2/db2-mfarticles/bell1, Retrieved on Dec. 3, 2007.

Communication from European Patent Office for Application No. 04812266.7/ patent No. 1700237 (6 pages), Dec. 3, 2010.

Decision to Refuse a European Patent Application from European Patent Office for Application No. 04 812 266.7-1527 (26 pages), May 10, 2011.

"University Information Technology Services DBS Standards," Database Administration Team, heep://web.archive/web/20030829082053, downloaded Jun. 1, 2011.

\* cited by examiner

METHOD AND SYSTEM FOR REMOVING ROWS FROM DIRECTORY TABLES

CROSS-REFERENCE TO RELATED APPLICATION

This application is a Continuation-in-part of U.S. patent application Ser. No. 10/911,828, filed Aug. 5, 2004, entitled "System and Method for Removing Rows From Directory Tables," which claims the benefit of U.S. Provisional Application No. 60/524,704, filed Nov. 24, 2003.

TECHNICAL FIELD

The present disclosure relates generally to database systems, and more particularly to a method and system for removing rows from directory tables.

BACKGROUND

In database systems, such as IBM DB2 databases, catalog tables and directory tables such as the SYSCOPY table and SYSLGRNX table store information needed by the database system for recovery. For example, information related to certain command execution and the times of execution are stored in these two tables. The two tables accumulate many records for activity in the tablespaces in an IBM DB2 database system.

As these two tables grow, any process accessing or using the tables may degrade in performance. For example, any updates to the database itself may degrade in performance. As further examples, making image copies, recovering tablespaces, and reorganizing tablespaces may take a significant amount of time due to the size of these two tables. However, removing obsolete rows from these tables is a complex task because the tables are considered critical for the operation and function of the databases. Thus, the database systems do not permit access to the tables using typical SQL operations such as INSERT, DELETE, and UPDATE.

SUMMARY

In accordance with the present invention, the disadvantages and problems associated with previous techniques for removing rows from directory tables may be reduced or eliminated.

In accordance with a particular embodiment of the present disclosure, a method for removing rows from directory tables includes creating an image copy of at least a portion of a database directory table. The method also includes identifying a plurality of candidate rows to delete from the directory table by comparing each row of the portion of the database directory table against one or more deletion criteria. The method further includes deleting the plurality of candidate rows from the image copy to establish an updated image copy.

Technical advantages of particular embodiments of the present disclosure include a system and method for removing rows from directory tables that scales beyond current methods to process large database directory tables and candidate deletion lists in less time than current methods. For example, near linear time consumption relative to the number of rows to be removed may be achieved.

Further technical advantages of particular embodiments of the present disclosure include a system and method for removing rows from directory tables that allows database administrators to automate the removal of SYSCOPY and SYSLGRNX rows. The system and method of the present disclosure, for example, may be run during a maintenance cycle for a database system such as an IBM DB2 database system.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

Figure 1:
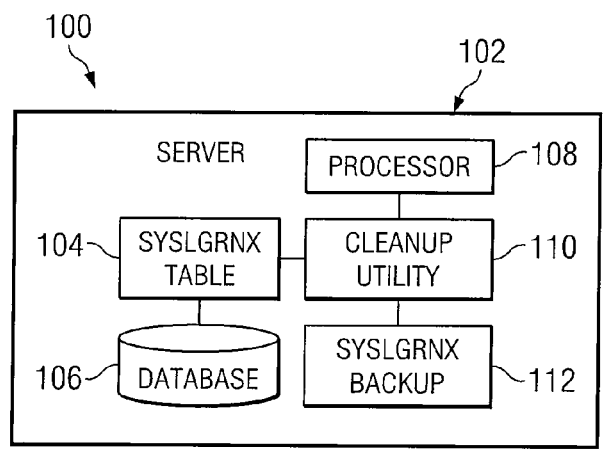
FIG. 1 is a block diagram illustrating a system for removing rows from directory tables according to the teachings of the present disclosure.

Enterprises store ever-increasing amounts of data that must be readily accessible. Enterprises must therefore ensure optimal performance for their databases and applications. However, enterprises struggle to find the time for both maintenance and optimization. Each minute that database maintenance interferes with data access can have an adverse impact. Enterprises need fast and dependable tools that streamline routine maintenance tasks, allowing more time for proactive database administration.

Enterprises especially need database management tools on mainframe systems that contain critical catalog and directory tables. For example, on mainframe systems running IBM's zSeries/Operating System (z/OS) and the IBM DB2 database system, catalog tables and directory tables such as the SYSCOPY table and SYSLGRNX table may store critical information needed by the database system for recovery in rows of each respective table. As an example, information related to certain command execution and the times of execution are stored in rows of these two tables. The two tables accumulate many rows, also referred to as records or entries, for every tablespace in an IBM DB2 database system.

As these two tables grow, any process accessing or using the tables will consume more and more resources. Regular maintenance of the SYSCOPY catalog table improves performance of consistency checking, image copy processing, recoveries, and reorganizations. In addition, regular maintenance of the SYSLGRNX directory table increases the efficiency of directory scans.

Thus, it is desirable to clean the tables by removing obsolete rows on a regular basis. Obsolete rows may refer to any outdated rows or any other rows determined to be unnecessary. However, removing data from these tables is a complex task because the tables are considered critical for the operation and function of the databases. Thus, the database systems do not permit access to the tables using typical SQL operations such as INSERT, DELETE, and UPDATE.

Existing methods to remove SYSLGRNX directory rows often perform poorly or fail completely when processing large SYSLGRNX tables. Other methods may allow for the deletion of SYSLGRNX directory rows associated with SYSCOPY rows using an index method to build a candidate deletion list. The list is then sorted and then the SYSLGRNX table pages are processed in page order. However, this index method may not scale well when SYSLGRNX is large or when the candidate deletion list is a relatively large percentage of the whole table.

In accordance with the teachings of the present disclosure, a method for removing rows from directory tables allows enterprises to perform regular, efficient removal of SYSCOPY and SYSLGRNX rows. The method scales beyond current methods to process large SYSLGRNX tables or candidate deletion lists that are a relatively large percentage of the whole in less time than current methods.

The method includes a two-pass sequential access to remove rows from the SYSLGRNX table. The first-pass process checks every row of every page against a hash table of deletion criteria, removing rows as matches are found. The deletion criteria may include one or more comparison tests that identify obsolete rows based on, for example, a timestamp.

The first-pass process may also cache spacemap page changes. A spacemap page refers to IBM DB2's internal representation of a tablespace that describes the logical to physical conversion of the page locations in a table space. IBM DB2 may track modified pages or available space in the tablespace using spacemap pages. Therefore, the second-pass process is responsible for applying the spacemap page changes cached in the first-pass process. Additional details of example embodiments of the present disclosure are described in detail below.

FIG. 1 is a block diagram illustrating a system 100 for removing rows from directory tables according to the teachings of the present disclosure. System 100 generally includes a server 102, a SYSLGRNX table 104, a database 106, a processor 108, a cleanup utility 110, and a SYSLGRNX backup 112.

Server 102 may refer to any suitable device operable to process data. Examples of server 102 may include a host computer, workstation, web server, file server, a personal computer such as a laptop, or any other device operable to process data. Although the present disclosure is discussed with reference to z/OS, server 102 may execute any of the other well-known MS-DOS, PC-DOS, MAC-OS, WINDOWS, UNIX, OpenVMS, or other appropriate operating systems, including future operating systems.

SYSLGRNX table 104 (full name SYSIBM.SYSLGRNX, also referred to as SYSLGRNG) refers to a table defined in an IBM DB2 database system directory, such as database 106. SYSLGRNX table 104 stores rows related to recovery log ranges such as the time an index space was defined with COPY YES and the time a tablespace was open for update. SYSLGRNX table 104 may not be referenced using SQL operations.

Database 106 may refer to any suitable device operable to store data, and facilitate addition, modification, and retrieval of such data. Database 106 may refer to an IBM DB2 database system such as DSNDB01. Database 106 may utilize data management systems, such as a relational database management system to store data and relationships between tables.

Processor 108 may refer to any suitable device operable to execute instructions and manipulate data to perform operations for system 100. Processor 108 may include, for example, any type of central processing unit (CPU). According to one embodiment of the present disclosure, processor 108 may operate as one of the main processors on a mainframe system running z/OS.

Cleanup utility 110 may refer to any suitable logic embodied in computer-readable media, and when executed, that is operable to perform various functions including removing rows from directory tables. As described in further detail below with reference to FIGS. 2-7, cleanup utility 110 allows for the deletion of the SYSLGRNX table 104 rows associated with SYSCOPY rows. SYSCOPY (full name SYSIBM.SYSCOPY) refers to a table defined in the IBM DB2 database system catalog that contains information needed for recovery.

SYSLGRNX backup 112 may refer to any suitable device operable for storing backup data. As described in further detail below, in the process of deleting SYSLGRNX table 104 rows, two image copies may be taken against SYSLGRNX table 104. The first copy is a fallback copy, and may be referred to as an LP copy. The second copy may contain an LP copy as a working copy and a verification copy, the verification copy being referred to as an LB copy. The LB copy may remain untouched for recovery processing and for verification that the process removed the correct rows.

Figure 2:
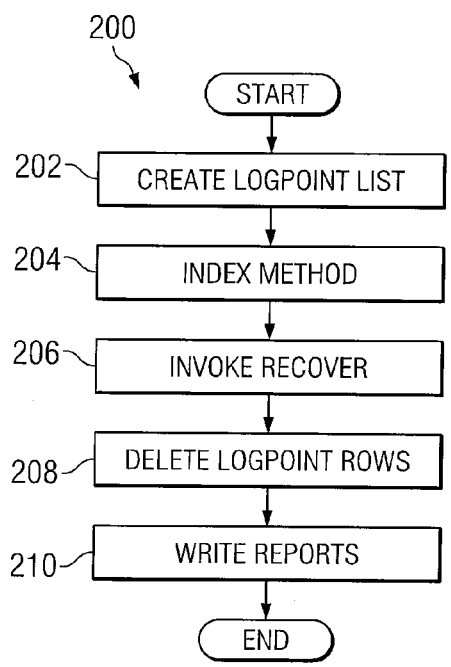
FIG. 2 is a flow diagram illustrating a method for removing rows from directory tables using an index method that may be used by the cleanup utility of FIG. 1.

FIG. 2 is a flow diagram illustrating a method 200 for removing rows from directory tables using an index method 204 that may be used by the cleanup utility 110 of FIG. 1. The method begins at step 202 where a logpoint list module fetches rows from a staging table and converts the rows into nodes in a log point list. The staging table may refer to an IBM DB2 database table that holds the starting points for SYSLGRNX deletion. The list may be ordered by DBID ascending, PSID ascending, DSNUM ascending and LOGPOINT descending. DBID refers to an internal database identifier assigned by an IBM DB2 database system to track a database. PSID refers to an internal pageset identifier for z/OS and OS/390. DSNUM refers to an integer that identifies the partition number of a partitioned pageset. For example, in a segmented or simple pageset, the DSNUM is zero (0). Specifying a DSNUM of zero for a partitioned pageset implies all partitions. LOGPOINT refers to a unique point in the IBM DB2 database system log. The nodes may be consolidated so that only one entry for each DBID, PSID and DSNUM exist. For partitioned objects, the DSNUM of zero may indicate that all parts will use the same LOGPOINT.

Next, at step 204, an index method creates the RID list. An RID refers to a row identifier that includes a page number and an ID on that page. A RID may be used to identify a row in a table. For each node in the logpoint list, the index method 204 reads the unique index defined on SYSLGRNX, DSNDB01.DSNLLX01. The index may be defined as a TYPE 2 index, for instance, for internal format and processing. The RID from each entry may be inserted into the ordered RID list. The key of the RID list is the RID number. Once starting index entry is located on a non-leaf page, the leaf-page pointers may be used to continue retrieving rows. A leaf page refers to a page that contains pairs of keys and RIDs and that point to actual data. Non-leaf page refers to a page that contains keys and page numbers of other pages in the index (either leaf or nonleaf pages). The RID from each entry is inserted into the ordered RID list.

Next within the index method of step 204, a copy utility, such as the IBM COPY utility, may be used to take an image copy of the DSNDB01.SYSLGRNX tablespace into SYSLGRNX backup 112, as an example. Two separate image copies of the DSNDB01.SYSLGRNX tablespace may be produced. The first copy is a fallback copy, and may be referred to as an LP copy. The second copy may contain an LP copy as a working copy and a verification copy, the verification copy being referred to as an LB copy. The LB copy may remain untouched for recovery processing and for verification that the process removed the correct rows.

After performing a copy, the ordered RID list may be processed. For each node in the list, the RID may be removed from the working image copy. For example, the following steps may be performed: a spacemap page covering a given RID is calculated; the spacemap page is read into the main storage; the page for the RID is read; and the RID on the page is removed.

Next, at step 206, a recover utility, such as IBM's RECOVER utility, recovers the modified DSNDB01.SYSLGRNX tablespace. When IBM RECOVER is invoked against this tablespace, no other IBM utilities may execute concurrently. A retry logic may be used which retries invoking the IBM RECOVER utility when the IBM RECOVER utility fails due to concurrency. If the RECOVER fails for any other reason, the fallback image copy may be restored as the working image copy.

At step 208, rows are removed from the staging table after a successful deletion of rows in SYSLGRNX. When a table is dropped, space in DBD (database descriptor) may be reclaimed. At step 210, a report writer module writes reports showing the details of what was processed.

Thus, the index method 204 builds a candidate deletion list. The list is then sorted and then the SYSLGRNX table pages are processed in page order. However, the index method 204 may not scale well when SYSLGRNX is large or when the candidate deletion list is a relatively large percentage of the whole table.

Figure 3:
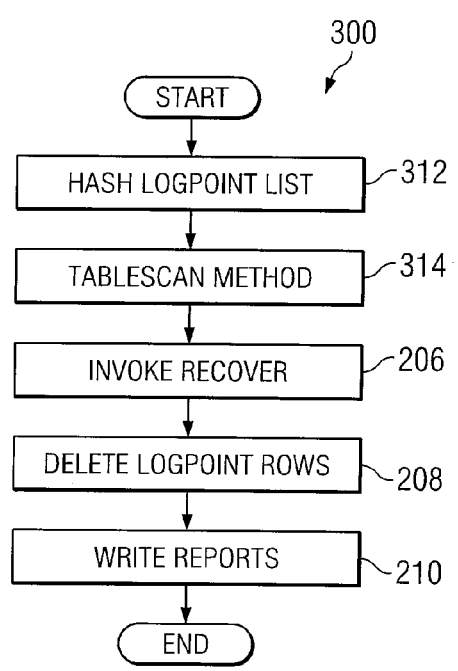
FIG. 3 is a flow diagram illustrating a method for removing rows from directory tables using a tablescan method that may be used by the cleanup utility of FIG. 1.

FIG. 3 is a flow diagram illustrating a method 300 for removing rows from directory tables using a tablescan method 314 that may be used by the cleanup utility 110 of FIG. 1. The tablescan method 314 may be performed rather than the index method 204 of FIG. 2 to process large SYSLGRNX tables and candidate deletion lists in less time.

At step 312, one or more deletion criteria are stored in a hash table in order to speed up the comparison of SYSLGRNX rows with the deletion criteria. The hash table may be created as follows. The hash table may include a number of entries equal to the number of delete criteria. The deletion criteria may include one or more comparison tests that identify obsolete rows based on, for example, a timestamp. The hashing procedure may be implemented as follows. First, three inputs to the hash procedure may be 1) DBID (database identifier); 2) PSID (pageset identifier); and 3) partition number. In one embodiment, the DBID and the PSID may be concatenated, and an exclusive-or (XOR) operation is performed using the concatenated DBID/PSID and the partition number. The results are divided by the hash table size. For example, this value may be equal to the number of criteria entries. In one embodiment, if the number of criteria entries is an even number, then 1 may be added to the hash table size to insure it is odd, this helps distribute the hashing evenly.

Next, at step 314, rather than reading the index to determine candidate RIDs, the tablescan method 314 reads the entire SYSLGRNX full image copy. The tablescan method 314 includes a two-pass sequential access to remove SYSLGRNX rows. The first-pass process checks every row of every page against the hash table of deletion criteria, removing rows as matches are found. spacemap page changes are also cached in the first-pass process. The second-pass process applies the spacemap page changes. Additional details of the tablescan method 314 are described in detail below with reference to FIGS. 4-7.

Next, steps 206-210 are performed. As described above with reference to FIG. 2, at step 206, a recover utility, such as IBM's RECOVER utility, recovers the modified DSNDB01.SYSLGRNX tablespace. When IBM RECOVER is invoked against this tablespace, no other IBM utilities may execute concurrently. A retry logic may be used which retries invoking the IBM RECOVER utility when the IBM RECOVER utility fails due to concurrency. If the RECOVER fails for any other reason, the fallback image copy may be restored as the working image copy. At step 208, rows are removed from the staging table after a successful deletion of rows in SYSLGRNX. When a table is dropped, space in DBD (database descriptor) may be reclaimed. At step 210, a report writer module writes reports showing the details of what was processed.

Figure 4:
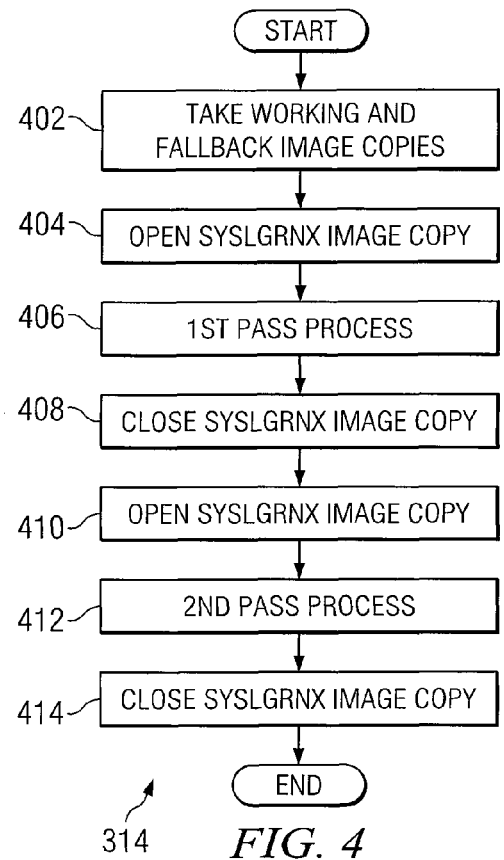
FIG. 4 is a flow diagram illustrating details of the tablescan method of FIG. 3, according to one embodiment of the present disclosure.

FIG. 4 is a flow diagram illustrating details of the tablescan method 314 of FIG. 3, according to one embodiment of the present disclosure. At step 402, a copy utility, such as the IBM COPY utility, may be used to take an image copy of the DSNDB01.SYSLGRNX tablespace into SYSLGRNX backup 112, as an example. Two separate image copies of the DSNDB01.SYSLGRNX tablespace may be produced. The first copy is a fallback copy, and may be referred to as an LP copy. The second copy should contain both a working copy and a verification copy, also referred to as an LB copy.

Next, at step 404, the working copy is opened for the first-pass process, performed at step 406. The first-pass process of step 406 compares all rows with the deletion criteria to either skip or delete a row. After the rows are removed, the image copy is closed at step 408.

Next, at step 410, the working copy is opened for the second-pass process, performed at step 412. The second-pass process 412 applies the spacemap page changes cached in the first-pass process at step 406. After the rows are removed and the spacemap page changes updated, the image copy is closed at step 414.

Figure 5:
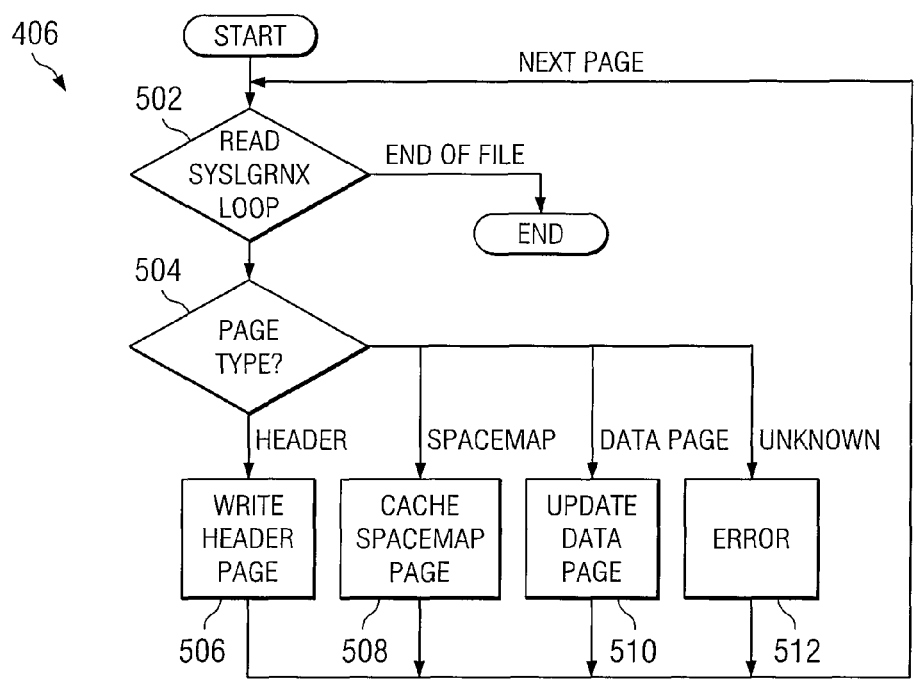
FIG. 5 is a flow diagram illustrating an example first-pass process of the tablescan method of FIG. 4, according to one embodiment of the present disclosure.

FIG. 5 is a flow diagram illustrating an example first-pass process 406 of the tablescan method 314 of FIG. 4, according to one embodiment of the present disclosure. Rather than reading the index to determine candidate RIDs, the tablescan method 314 reads the whole SYSLGRNX full image copy from the first page to the end. Thus, all rows on the page are checked against the deletion criteria. The first-pass process 406 is implemented as a loop that starts at step 502, checks a page type at step 504 until reaching the end of file at step 502 where the loop is terminated. The first-pass process operates by page type, such as header pages in step 506, cache spacemap pages at step 508, data pages at step 510, and unknown (error) pages at step 512, and writes the candidate RID report rows accordingly. Additional details of the update process at step 510 is described in greater detail below with reference to FIG. 6.

Figure 6:
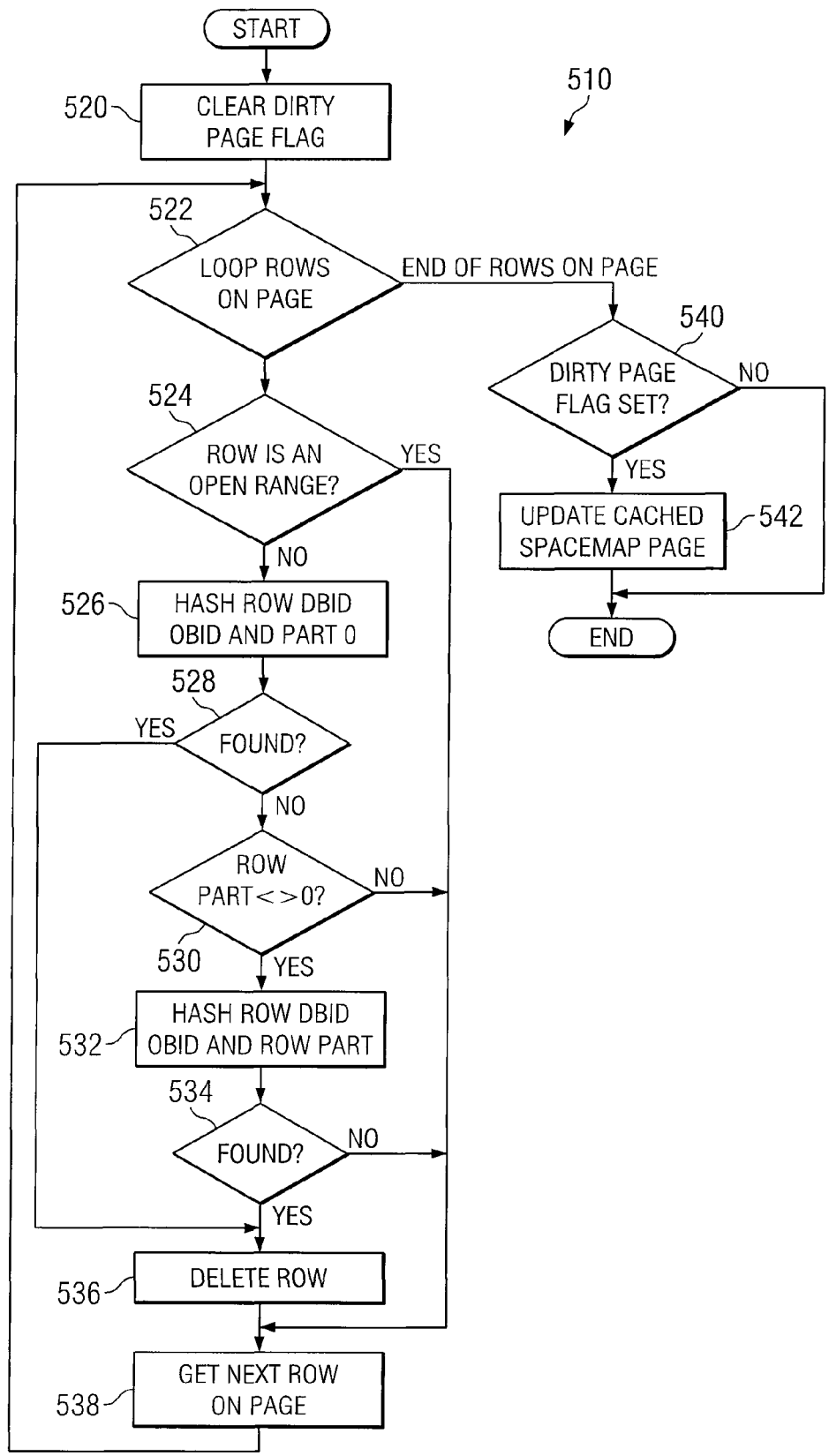
FIG. 6 is a flow diagram illustrating an example update data page process of the first-pass process of FIG. 5, according to one embodiment of the present disclosure.

FIG. 6 is a flow diagram illustrating an example update data page process 510 of first-pass process 406 of FIG. 5, according to one embodiment of the present disclosure. In general, update data page process 510 reads a page and each row of the page to determine whether each row matches deletion criteria. Update data page process 510 may be performed for pages as determined by first-pass process 406 of FIG. 5. Update data page process 510 begins at step 520 where a dirty page flag is cleared before a page is processed. At step 522, update data page process 510 loops over each row for the page and performs the following steps.

At step 524, it is determined whether the row is an open range. If the row is an open range, the loop continues to the next row on the page at step 538. If the row is not an open range, update data page process 510 continues to steps 526-534 looking for a match against deletion criteria, deleting rows as matches are found at step 536. For example, at step 526, as described above with reference to FIG. 3, the DBID and the PSID may be concatenated, and an exclusive-or (XOR) operation is performed using the concatenated DBID/PSID and the partition number. At step 526, the partition number is set to 0 to determine whether the row partition number is relevant to the deletion of the row. The result of the XOR operation is divided by the hash table size. The remainder is a slot number. A slot may contain a chain of 0, 1, or n entries. In one embodiment, the chain may be 0, 1, or n entries. However, this design has a high likelihood of having 0 or 1 entries which allows for a very rapid test for each row of each page. In the embodiment, the chain may be ordered so that if there are 2 or more entries, the procedure may scan until the input value is higher than the current position on the chain. At that point, the procedure may determine that the input value is not in the chain, which may reduce the time to make a decision on a match.

If a match is found at step 528, the row is deleted at step 536. If a match is not found, and the actual row partition number is equal to 0 as determined at step 530, the loop continues to the next row on the page at step 538. If a match is not found, and the actual row partition number is not equal to 0 at step 530, update data page process 510 continues to step 532 where the actual row partition number is used in the same XOR operation as described above to compare the deletion criteria stored in the hash table. If a match is found at step 534, the row is deleted at step 536. If a match is not found, the loop continues to the next row on the page at step 538.

At step 540, after update data page process 510 processes each row on a page, it is determined whether the dirty page flag is set for the page. If the dirty page flag is set, at step 542, update data page process 510 updates cached spacemap pages for the second-pass process described below with reference to FIG. 7. If the dirty page flag is not set, update data page process 510 terminates.

Figure 7:
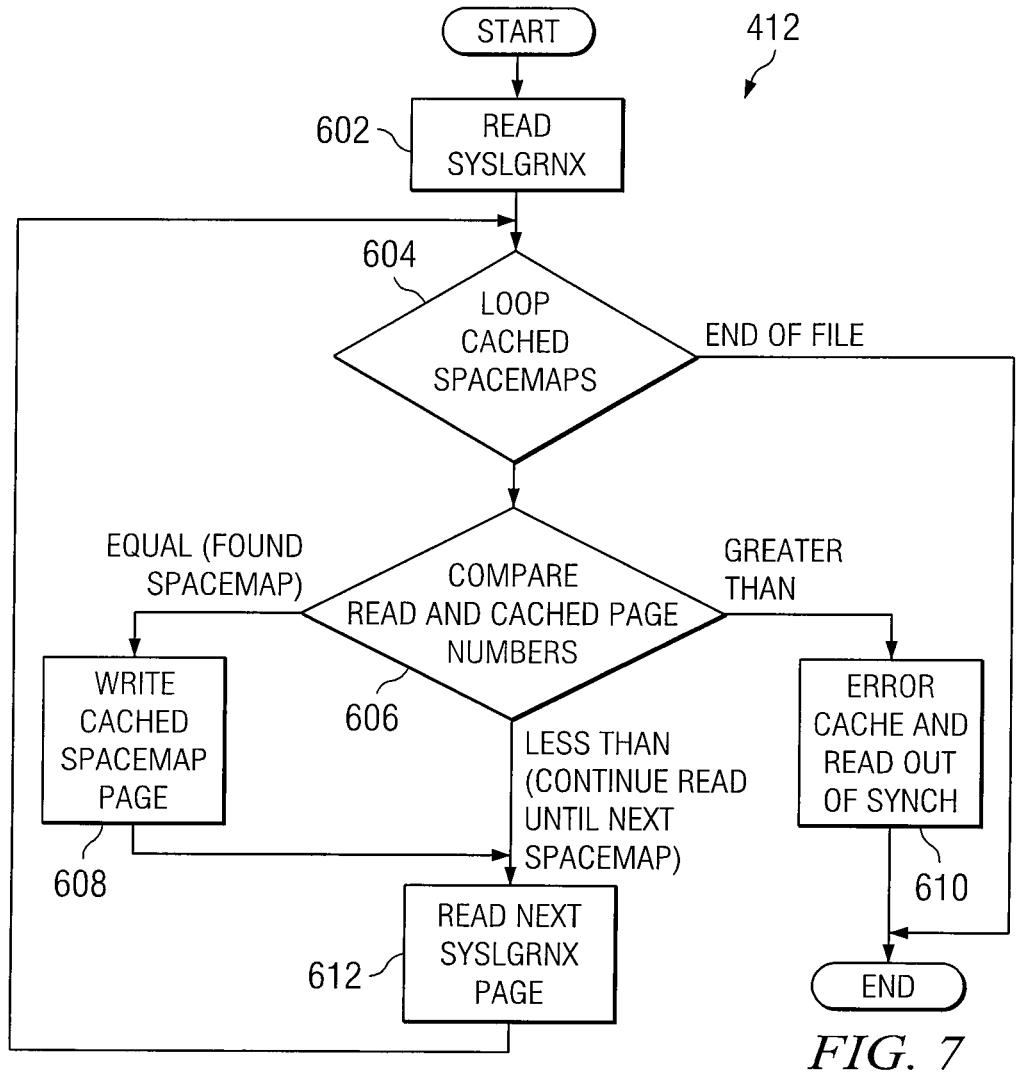
FIG. 7 is a flow diagram illustrating an example second-pass process of the tablescan method of FIG. 4, according to one embodiment of the present disclosure.

FIG. 7 is a flow diagram illustrating an example second-pass process 412 of the tablescan method 314 of FIG. 4, according to one embodiment of the present disclosure. After every row of every page is checked against the hash table of deletion criteria in the first-pass process, spacemap page changes are cached. The second-pass process 412 applies the spacemap page changes. The second-pass process 412 is implemented as a loop over each SYSLGRNX page that loops over cached spacemap pages at step 604. At step 606, the cached spacemap pages are compared to determine if they are equal. If the result of the comparison is equal, the spacemap page change is written at step 608. If the result of the comparison is "less-than," the method continues to the next spacemap page. If the result of the comparison is "greater-than," the method is terminated with an error result.

Thus, the tablescan method described herein scales beyond current methods to process large SYSLGRNX tables and candidate deletion lists in less time than current methods. The tablescan method includes a two-pass sequential access to remove rows from the SYSLGRNX directory table. The first-pass process checks every row of every page against a hash table of deletion criteria, removing rows as matches are found. Spacemap page changes are also cached in the first-pass process. The second-pass process applies the spacemap page changes.

Numerous other changes, substitutions, variations, alterations and modifications may be ascertained by those skilled in the art and it is intended that the present disclosure encompass all such changes, substitutions, variations, alterations and modifications as falling within the spirit and scope of the appended claims. Moreover, the present disclosure is not intended to be limited in any way by any statement in the specification that is not otherwise reflected in the claims.

What is claimed is:

1. A method for removing rows from directory tables, comprising:
   creating an image copy of at least a portion of a database directory table, the database directory table not accessible using a delete operation;
   identifying a plurality of candidate rows to delete from the directory table by comparing each row of the image copy of the portion of the database directory table against one or more deletion criteria;
   deleting the plurality of candidate rows from the image copy to establish an updated image copy;
   during a first pass process on the database directory table, caching a plurality of spacemap pages, wherein the first pass process comprises a first table scan of the database directory table and the plurality of spacemap pages comprise an indication of available page space in the database directory table; and
   during a second pass process on the database table, applying the plurality of cached spacemap pages to the image copy of the portion of the database directory table, wherein the second pass process is performed after the first pass process and comprises a second table scan of the database directory table and wherein applying the cached space map page comprises determining if the spacemap pages are less than or equal to track modified pages.

2. The method of claim 1, wherein creating an image copy of a database directory table comprises creating a working image copy and a fallback image copy of the directory table.

3. The method of claim 2, further comprising:
   determining if the deleting is successful;
   recovering the database directory table from the updated image copy if the deleting is successful; and
   recovering the database directory table from the fallback image copy if the deleting fails.

4. The method of claim 1, wherein identifying a plurality of candidate rows to delete from the directory table by comparing each row of the portion of the database directory table against one or more deletion criteria comprises comparing each row of the portion of the database directory table against a hash table of one or more deletion criteria.

5. The method of claim 1, further comprising providing a report identifying the deleted plurality of candidate rows.

6. The method of claim 1, wherein comparing each row of the portion of the database directory table against one or more deletion criteria comprises comparing each row of a plurality of pages of the portion of the database directory table against one or more deletion criteria.

7. The method of claim 1, wherein, when applying the cached spacemap pages to the image copy comprises:

for each of at least one page of the database directory table, determining that a dirty page flag is set for the at least one page; and in response to determining that the dirty page flag is set, updating a cached spacemap page for the at least one page.

8. A system for removing rows from directory tables, comprising:

a storage device; and a processor, the processor operable to execute a program of instructions operable to:

create an image copy of at least a portion of a database directory table, the database directory table not accessible using a delete operation;

identify a plurality of candidate rows to delete from the directory table by comparing each row of the image copy of the portion of the database directory table against one or more deletion criteria;

delete the plurality of candidate rows from the image copy to establish an updated image copy;

during a first pass process on the database directory table, cache a plurality of spacemap pages, wherein the first pass process comprises a first table scan of the database directory table and the plurality of spacemap pages comprise an indication of available page space in the database directory table; and during a second pass process on the database table, apply plurality of the cached spacemap pages to the image copy of the portion of the database directory table, wherein the second pass process is performed after the first pass process and comprises a second table scan of the database directory table and wherein applying the cached space map page comprises determining if the spacemap pages are less than or equal to track modified pages.

9. The system of claim 8, wherein the program of instructions is further operable to create a working image copy and a fallback image copy of the directory table.

10. The system of claim 9, wherein the program of instructions is further operable to:

determine if the deleting is successful;

recover the database directory table from the updated image copy if the deleting is successful; and recover the database directory table from the fallback image copy if the deleting fails.

11. The system of claim 8, wherein the program of instructions is further operable to compare each row of the portion of the database directory table against a hash table of one or more deletion criteria.

12. The system of claim 8, wherein the program of instructions is further operable to provide a report identifying the deleted plurality of candidate rows.

13. The system of claim 8, wherein the program of instructions is further operable to compare each row of a plurality of pages of the portion of the database directory table against one or more deletion criteria.

14. The system of claim 8, wherein, when applying the cached spacemap pages to the image copy, the processor is further operable to:

for each of at least one page of the database directory table, determine that a dirty page flag is set for the at least one page; and in response to determining that the dirty page flag is set, update a cached spacemap page for the at least one page.

15. Logic encoded in a tangible computer-readable media, the logic being operable, when executed on a processor, to:

create an image copy of at least a portion of a database directory table, the database directory table not accessible using a delete operation;

identify a plurality of candidate rows to delete from the directory table by comparing each row of the image copy of the portion of the database directory table against one or more deletion criteria;

delete the plurality of candidate rows from the image copy to establish an updated image copy;

during a first pass process on the database directory table, cache a plurality of spacemap pages, wherein the first pass process comprises a first table scan of the database directory table and the plurality of spacemap pages comprise an indication of available page space in the database directory table; and during a second pass process on the database table, apply the plurality of cached spacemap pages to the image copy of the portion of the database directory table, wherein the second pass process is performed after the first pass process and comprises a second table scan of the database directory table and wherein applying the cached space map page comprises determining if the spacemap pages are less than or equal to track modified pages.

16. The logic of claim 15, wherein the logic is further operable to create a working image copy and a fallback image copy of the directory table.

17. The logic of claim 16, wherein the logic is further operable to:

determine if the deleting is successful;

recover the database directory table from the updated image copy if the deleting is successful; and recover the database directory table from the fallback image copy if the deleting fails.

18. The logic of claim 15, wherein the logic is further operable to compare each row of the portion of the database directory table against a hash table of one or more deletion criteria.

19. The logic of claim 15, wherein the logic is further operable to provide a report identifying the deleted plurality of candidate rows.

20. The logic of claim 15, wherein, when applying the cached spacemap pages to the image copy, the logic is further operable to:

for each of at least one page of the database directory table, determine that a dirty page flag is set for the at least one page; and in response to determining that the dirty page flag is set, update a cached spacemap page for the at least one page.

21. Logic encoded in a tangible computer-readable media, the logic being operable, when executed on a processor, to:

create an image copy of at least a portion of a database directory table, the database directory table not accessible using a delete operation;

identify a plurality of candidate rows to delete from the directory table by comparing each row of the image copy of the portion of the database directory table against one or more deletion criteria;

delete the plurality of candidate rows from the image copy to establish an updated image copy;

cache a plurality of spacemap pages, wherein the plurality of spacemap pages comprise an indication of available page space in the database directory table; and apply the plurality of cached spacemap pages to the image copy of the portion of the database directory table, wherein applying the cached space map page comprises determining if the spacemap pages are less than or equal to track modified pages, and wherein, when creating the image copy, the logic is further operable to:

create a first image copy comprising a fallback copy;

create a second image copy, the second image copy comprising:

a working copy; and a verification copy that is not touched during recovery processing.

22. A method for removing rows from directory tables, comprising:

creating an image copy of at least a portion of a database directory table, the database directory table not accessible using a delete operation;

identifying a plurality of candidate rows to delete from the directory table by comparing each row of the image copy of the portion of the database directory table against one or more deletion criteria;

deleting the plurality of candidate rows from the image copy to establish an updated image copy;

caching a plurality of spacemap pages, wherein the plurality of spacemap pages comprise an indication of available page space in the database directory table; and applying the plurality of cached spacemap pages to the image copy of the portion of the database directory table, wherein applying the cached space map page comprises determining if the spacemap pages are less than or equal to track modified pages, and wherein creating the image copy comprises:

creating a first image copy comprising a fallback copy;

creating a second image copy, the second image copy comprising:

a working copy; and a verification copy that is not touched during recovery processing.

23. A system for removing rows from directory tables, comprising:

a storage device; and a processor, the processor operable to execute a program of instructions operable to:

create an image copy of at least a portion of a database directory table, the database directory table not accessible using a delete operation;

identify a plurality of candidate rows to delete from the directory table by comparing each row of the image copy of the portion of the database directory table against one or more deletion criteria;

delete the plurality of candidate rows from the image copy to establish an updated image copy;

cache a plurality of spacemap pages, wherein the plurality of spacemap pages comprise an indication of available page space in the database directory table; and apply plurality of the cached spacemap pages to the image copy of the portion of the database directory table, wherein applying the cached space map page comprises determining if the spacemap pages are less than or equal to track modified pages, and wherein, when creating the image copy, the processor is further operable to:

create a first image copy comprising a fallback copy;

create a second image copy, the second image copy comprising:

a working copy; and a verification copy that is not touched during recovery processing.

\* \* \* \* \*